(12) United States Patent
Bichot et al.

(10) Patent No.: US 7,881,343 B2
(45) Date of Patent: Feb. 1, 2011

(54) MULTI-NETWORK OVERLAID CELL DETECTION

(75) Inventors: Guillaume Bichot, La Chapelle Chaussee (FR); Jun Li, Plainsboro, NJ (US); Wen Gao, Plainsboro, NJ (US); Philippe Gilberton, Princeton, NJ (US)

(73) Assignee: Thomson Licensing, Boulogne, Billancourt (FR)

( * ) Notice: Subject to any disclaimer, the term of this patent is extended or adjusted under 35 U.S.C. 154(b) by 1197 days.

(21) Appl. No.: 10/573,461

(22) PCT Filed: Oct. 3, 2003

(86) PCT No.: PCT/US03/31536

§ 371 (c)(1),
(2), (4) Date: Mar. 24, 2006

(87) PCT Pub. No.: WO2005/043866

PCT Pub. Date: May 12, 2005

(65) Prior Publication Data

US 2008/0247378 A1    Oct. 9, 2008

(51) Int. Cl.
H04B 7/216 (2006.01)
H04L 7/00 (2006.01)
(52) U.S. Cl. .............. 370/503; 370/320; 370/252; 370/255; 370/458; 375/356; 375/365; 375/366
(58) Field of Classification Search .......... 370/503, 370/320, 252, 255, 458, 310, 324, 328, 338, 370/350, 347, 509; 375/356, 365, 366
See application file for complete search history.

(56) References Cited

U.S. PATENT DOCUMENTS 6,597,911 B1   7/2003   Kransmo
7,194,011 B1 *  3/2007   Nassiri-Toussi et al. ..... 370/503
2002/0085516 A1  7/2002   Bridgelall
2003/0099223 A1  5/2003   Chang et al.
2003/0108007 A1  6/2003   Holeman et al.
2004/0005817 A1  1/2004   Moon et al.
2004/0058679 A1  3/2004   Dillinger et al.
2004/0058717 A1  3/2004   McDonnell et al.

(Continued)

FOREIGN PATENT DOCUMENTS

CN    1264228 A    8/2000

(Continued)

OTHER PUBLICATIONS

Copy of Search Report Dated Mar. 29, 2004.

Primary Examiner—Patrick N Edouard
Assistant Examiner—Julio Perez
(74) Attorney, Agent, or Firm—Robert D. Shedd; Robert B. Levy

(57) ABSTRACT

A communications system includes a wireless telephony network and a wireless Local Area Network (LAN), both accessible by a mobile communications device (16). To facilitate transitioning of the mobile communications device to the wireless LAN from the wireless telephony network, the wireless LAN includes a beacon transmitter, which generates a synchronization channel having a pattern unique to the wireless LAN. The Wireless LAN synchronization channel is received at a first receiver in the mobile communications device together with a synchronization channel from the wireless telephony. The wireless LAN synchronization channel enables the mobile communication device to synchronize with, for transitioning to, the wireless LAN.

6 Claims, 2 Drawing Sheets

U.S. PATENT DOCUMENTS

2004/0081117 A1*  4/2004  Malek et al. ................. 370/324
2007/0091845 A1*  4/2007  Brideglall ................... 370/331

FOREIGN PATENT DOCUMENTS

| EP | 1073303 | 1/2001 |
| EP | 1 613 112 A1 | 1/2006 |
| JP | 2000-92541 A | 3/2000 |
| JP | 2002-535902 T | 10/2002 |
| WO | WO 00/42808 A1 | 7/2000 |
| WO | WO 2004/091244 A1 | 10/2004 |

* cited by examiner

MULTI-NETWORK OVERLAID CELL DETECTION

The applicants hereby claim the priority under 35 USC 119(a) of International Application PCT/US2003/031536, filed Oct. 3, 2003 and was published in accordance with PCT Article 21(2) on May 12, 2005 in English.

TECHNICAL FIELD

This invention relates to a technique for enabling a mobile communications device to transition from a first wireless communications network to a second network.

BACKGROUND ART

Wireless telephony technology continues to evolve over time. Most recently, the European Telecommunications Standards Institute (ETSI) has promulgated a new standard for mobile telephony service, known as "Universal Mobile Telecommunications Service" or UMTS which offers broadband, packet-based transmission of voice, text, video and multimedia information at rates as high as 2 Mbs. The proposed UMTS standard describes a wireless network that includes one or more radio access nodes, each typically referred to as a "Node B." One or more Radio Network Controllers (RNC) exist within the UMTS network to manage the radio access nodes. Each RNC has a broadband connection, typically in the form of an Asynchronous Transport Mode (ATM) Link, to a UMTS core network that provides Authorization, Authentication and Accounting (AAA) Functions.

Advances in the field of wireless LAN technology have resulted in the emergence of publicly accessible wireless LANs (e.g., "hot spots") at rest stops, cafes, libraries and similar public facilities. Presently, wireless LANs offer mobile communications device users access to a private data network, such as a Corporate Intranet, or a public data network such as the Internet. The relatively low cost to implement and operate a wireless LAN, as well as the available high bandwidth (usually in excess of 10 Megabits/second) makes the wireless LAN an ideal access mechanism through which the mobile communications device user can exchange packets with an external entity.

Given the lower access cost and higher bandwidth afforded by wireless LANs, users of mobile communications devices often find it advantageous to transition from a wireless telephony network, such as the UMTS network, to a wireless LAN. To that end, many present day wireless LAN operators provide coverage areas that overlap the coverage area of a UMTS network. Also, many mobile communication device manufacturers will include a dual protocol stack within the device to enable the device user to transition between networks.

Ideally, transitioning from the wireless telephone network to the wireless LAN (and vice versa) should occur seamlessly, i.e., without any loss of communications. To achieve a seamless transition from a UMTS network to the wireless LAN, the mobile communications device must first detect entry into the coverage area of the wireless LAN before undertaking a handoff from the wireless telephony network to the wireless LAN. Presently, the mobile communications device undertakes detection of a wireless LAN by operating a second receiver tuned to the wireless LAN while a first receiver remains tuned to the wireless telephony network. Continuously operating both the first and second receivers concurrently consumes battery resources in the mobile communications device, often a precious commodity.

Thus, there is a need for a technique for enabling a mobile communications device to seamlessly transition from one wireless network to another while overcoming the aforementioned disadvantage of the prior art.

BRIEF SUMMARY OF THE INVENTION

Briefly, in accordance with the present principles, there is provided a technique for enabling a mobile communications device to transition from a first wireless communications network, such as a wireless telephony network, to a second wireless network, such as a wireless LAN. To enable such a transition, a synchronization signal (hereinafter referred to as the "second network synchronization signal") is generated in the second wireless network with a synchronization pattern that is unique to that network. In other words, the second network synchronization signal is readily distinguishable from a first network synchronization signal generated by the first network. The second wireless network broadcasts the second network synchronization signal for receipt by a common receiver in the mobile communications device that also receives the first network synchronization signal. Upon receipt of the second network synchronization signal, the mobile communications device can establish a communication session with the second wireless network to enable a transition thereto from the first wireless communications network. Transmitting the second network synchronization signal for receipt at the same receiver in the mobile communications device that receives the first network synchronization signal obviates the need to continuously operate two separate receivers, thus reducing the consumption of battery resources.

DETAILED DESCRIPTION

Figure 1:
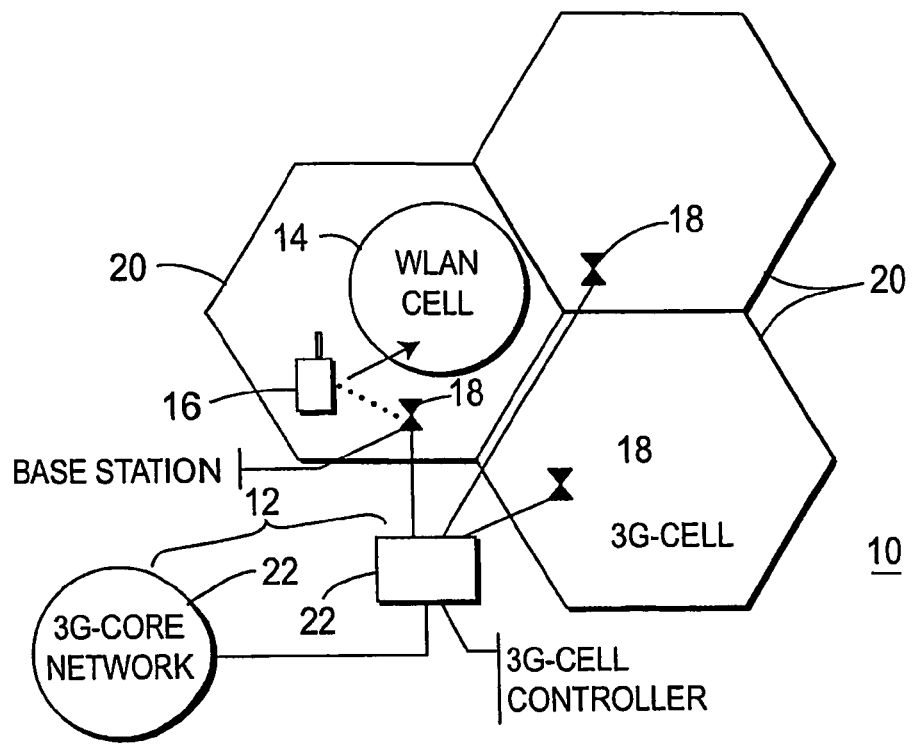
FIG. 1 depicts a block schematic diagram of a first wireless communications network interworked with a second wireless communications network.

FIG. 1 depicts a block schematic diagram of a communications system 10 that includes a first wireless communication network 12 interworked with a second wireless communication network 14 for providing communications services to one or more mobile communications devices, exemplified by device 16. In practice, the mobile communications device 16 can comprise a wireless telephony handset, a wireless Personal Data Assistant (PDA) or a personal computer having a wireless modem. In the illustrated embodiment, the first wireless communications network 12 comprises a wireless telephony network having an architecture in conformance with the well-known Universal Mobile Telephone (i.e., 3G) standard. To that end, the wireless telephony network 12 includes at least one, and preferably, a plurality of radio access nodes 18 (each typically referred to as a "node B"), each node providing wireless telephony service within a corresponding area (cell) 20.

The wireless telephony network 12 of FIG. 1 also includes at least one Radio Node Controller (RNC) 22 for controlling one or more of the plurality of radio access nodes 18. Depending on the number cells 20 and hence, the number of radio access nodes 18, the wireless telephony network 12 could include a plurality of RNCs 22. Each RNC 22 is controlled by a core network 24 that typically includes at least a Serving Gateway Service Node (SGSN) (not shown) that provides Authentication, Authorization and Accounting (AAA) functions within the core network. The second wireless network 14 may be partially or fully overlaid by a first one of the cells 20, with FIG. 1 depicting a fully overlaid cell 20.

Figure 2:
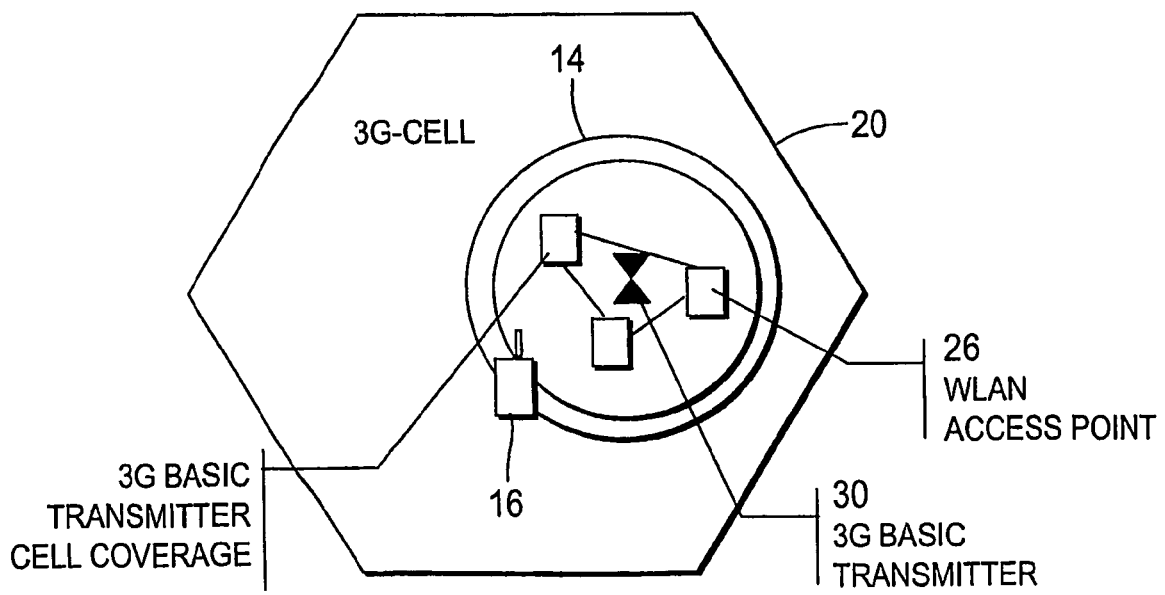
FIG. 2 depicts a block schematic diagram of the details of the second wireless communications network modified in accordance with the present principles.

Referring to FIG. 2, the second wireless communications network 14 typically takes the form of a wireless LAN that includes one or more access points 26. Each access point 26 within the wireless LAN 14 includes a radio transceiver (not shown) for transmitting RF signals to, and for receiving RF signals from the mobile communications device 16. In practice, one or more of the access points 26 of the wireless LAN 14 reside within one of the cells 20 of the wireless telephony network 12 of FIG. 1. Thus, the mobile communications device 16, while resident in a cell 20, will enter the coverage area of one of the access points 26 of the wireless LAN 14 and can initiate a communications session with the wireless LAN.

Ideally, the transition (hand off) of the mobile communications device 16 from the wireless telephony network 12 of FIG. 1 to the wireless LAN 14 illustrated in FIG. 2 should occur seamlessly. In other words, the capability should exist for the mobile communications device 16 to establish a communications session with the wireless LAN 16 while the device remains in communications with the wireless telephony network 12 of FIG. 1. In order for the mobile communications device 16 to establish a communications session with the wireless LAN 14, the device must have the ability to detect the presence of the wireless LAN.

Traditionally, the mobile communications device 16 has continuously operated two protocol stacks, and two receivers (not shown), one tuned to the wireless telephony network 12, and the other tuned to the wireless LAN 14. In this way, the mobile communications device can detect the presence of the wireless LAN while still in communications with the wireless telephone network. This approach to achieving seamless transitioning between networks, while effective, nonetheless requires the continuous use of two separate receivers, and the attendant consumption of precious battery power.

In accordance with the present principles, seamless transitioning can be effected without the need to operate two separate receivers simultaneously within the mobile communications device 16. To enable the communications device 16 to detect the presence of the wireless LAN 14 by means of a first receiver (not shown) in the device, the wireless LAN 14 includes a basic transmitter 30 that transmits an identifying signal at the same frequency as a synchronizing signal transmitted by the wireless telephony network 12. The identifying signal transmitted by the transmitter 30 of FIG. 2 has a format compatible with the wireless telephony network 12 but is unique to the wireless LAN 14, thereby avoiding interference with the synchronizing signal from the wireless telephony network 12. In practice, the identifying signal transmitted by the transmitter 30 of FIG. 2 has a signal strength corresponding to the coverage of the wireless LAN 14.

Figure 3:
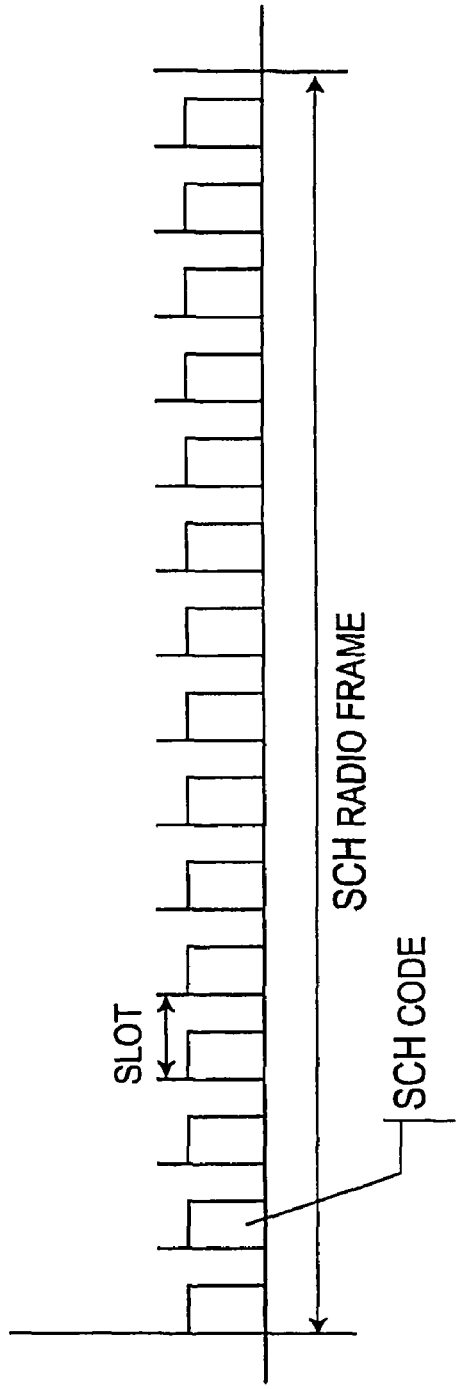
FIG. 3 depicts a first embodiment of a synchronizing signal for synchronizing a mobile communications device with the second wireless communications network of FIGS. 1 and 2.

The identifying signal transmitted by the transmitter 30 of FIG. 2 can take one of several forms. Referring to FIG. 3, the signal from the transmitter 30 of FIG. 2 can take the form of a Primary Synchronization Channel (P-SCH) corresponding to a downlink signal transmitted in the wireless telephony network 12 for effecting synchronization at the outset of a cell search. The P-SCH signal depicted in FIG. 3 comprises a periodic synchronizing code having fifteen slots per frame, each frame being typically 10 ms in length. The synchronizing code is the same for each slot and has a format unique to the wireless LAN 14 so that the mobile communications device, upon receiving the code can specifically identify the wireless LAN 14 of FIG. 2.

In practice, the mobile communications device 16 establishes the identity of the wireless LAN 14 by matching the characteristics of the received P-SCH channel to one of a plurality of stored patterns in memory, each pattern corresponds to a particular wireless network technology. Once the mobile communications device 16 establishes the identity of the wireless LAN 14, the device stops the search for a match. Thereafter, the mobile communications device 16 initiates operation of a second receiver dedicated to the associated wireless LAN radio technology to effect the transition from the wireless telephony network 12 of FIG. 1. In the illustrated embodiment, the Frequency Division Duplex (FDD) mode is assumed when the wireless telephony network 12 embodies WCDMA technology. In a wireless telephony network embodying TDMA technology, the Time Division Duplex (TDD) mode or a similar mechanism would apply.

Figure 4:
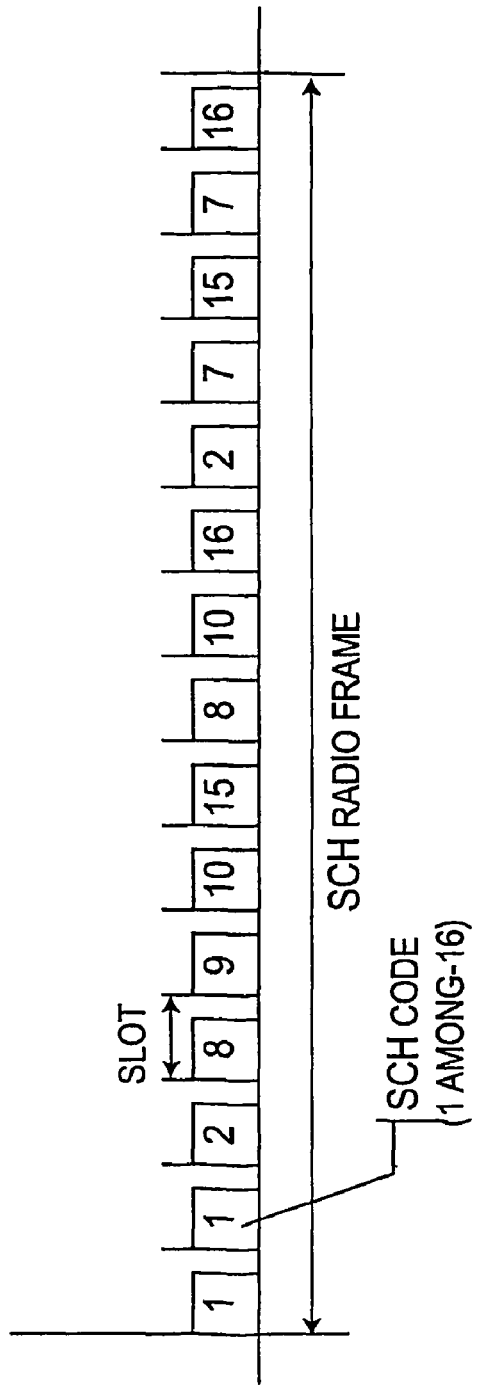
FIG. 4 depicts a second embodiment of a synchronizing signal for synchronizing a mobile communications device with the second wireless communications network of FIGS. 1 and 2.

As an alternative solution, the transmitter 30 could transmit a Secondary Synchronization Channel (S-SCH) as seen in FIG. 4 which is comparable to the downlink signal transmitted by the wireless telephony network 12 of FIG. 1 to effect frame synchronization and scrambling code detection as part of the cell search operation. In practice, the S-SCH channel corresponds to the repetition of a sequence of fifteen Secondary Synchronization codes (SSCs). Each code is chosen among sixteen such codes and is modulated within a given time slot. There exist sixty-four different possible combinations (or SSC sequences), each sequence corresponding to a separate scrambling code group and each having the same duration as the collective fifteen slots of a radio frame. Upon receipt of the SSC sequence, the first receiver in the mobile communications device 16 matches the sequence to a corresponding stored value indicative of the scrambling code group. Thereafter, the first receiver in the mobile communications device 16 finds the scrambling code group and becomes frame synchronized to the basic transmitter 30.

After finding the scrambling code group, the first receiver within the mobile communications device 16 looks for a primary CPICH (Common Pilot Channel) channel that carries a well-specified bit sequence that is the same for all cells. From knowledge of the scrambling code group, the receiver will attempt a match to the CPICH channel bit sequence to the stored value (1 among 8 possible sequences). In this way, the first receiver will detect the wireless LAN 14. The wireless LAN detection mechanism is based on the reservation of a scrambling code (the combination of a scrambling code group and a scrambling code in that group) allocated for inter-working of the wireless LAN 14 of FIG. 2 with the wireless telephony network 12 of FIG. 1.

In case the operator of the wireless LAN 14 implements more than one wireless LAN technology, the above-described detection mechanism requires enhancement in one of the two ways:

First Solution:

Each new wireless LAN inter-working technology receives its own scrambling code. Standardization of this solution could prove potentially problematic since the number of downlink primary scrambling codes is limited.

Second Solution:

After recognition of this wireless LAN scrambling code, the mobile communication device 16 will go through an extra step to identify the radio technology of the wireless LAN by looking for the Primary Common Control Physical Channel (PCCPCH) that carries system information. The P-CCPCH channel has a well-specified channelization code and thus can bring a new type of system message that will allow the mobile communications device 16 to discover the type of wireless LAN cell it is entering.

In order to implement the second solution, the following are required:

The mobile communications device 16 must monitor listed cells (including the wireless LAN 14). To identify a cell, the mobile communications device 16 must identify its primary scrambling code (one among 512). This solution works as long as the cell belongs to the monitored list. Typically, the mobile communications device 16 is constrained in terms of the maximum numbers of cells the device can measure in parallel.

Once it detects the wireless LAN 14, the mobile communications device 16 stops searching for cells and no longer performs any measurement, nor does it signal the presence of any subsequently detected cell to its corresponding cell controller. After being detected, the wireless LAN 14 manages future communication with the mobile communications device 16.

Ideally, there should be standardization of the scrambling codes dedicated to wireless LAN technology by the 3GPP standardization body or the like. In addition, there should also be standardization of the message format and content. Although standardization of the message format and content isn't mandatory, such standardization will assure that all mobile terminals will be compliant regardless of the network operator.

The foregoing describes a technique for enabling a mobile communications device to seamlessly transition from a wireless telephony network to a wireless LAN without unnecessary consumption of battery resources.

The invention claimed is:

1. A method for enabling a mobile communications device to transition from a first wireless communications network to a second wireless communications network, comprising the steps of:

generating in the second network a second network synchronization signal having a prescribed pattern unique to the second network; and broadcasting the second network synchronization signal for receipt at a common receiver in the mobile communications device together with a first network synchronization signal from the first network to enable to the mobile communications device to synchronize with, and transition to, the second wireless communications network;

wherein the second network synchronization signal is transmitted at a same frequency as the first network synchronization signal; and wherein the generating step comprises generating a Secondary-Synchronization Signal of a type utilized within the first wireless communications network for achieving frame synchronization and scrambling code detection in connection with a cell search.

2. The method according to claim 1 wherein the generating step comprises the step of generating a Primary-Synchronization Signal of a type utilized within the first wireless communications network for cell searching.

3. A method of operating a mobile communications device to enable a seamless transition from a first wireless communications network to a second wireless communications network, comprising the steps of:

receiving at a common receiver in the mobile communications device a second network synchronization signal from the second wireless communications network together with a first network synchronization signal from the first wireless communications network; the second network synchronization signal having a pattern unique to the second wireless communications network, and having a same frequency as the first network synchronization channel;

establishing the identity of the second wireless communications network by matching the pattern of second network synchronization signal with the pattern associated with the second wireless communications network; and transitioning to the second communications network after the identity thereof has been established;

wherein the second network synchronization signal comprises a Secondary-Synchronization signal of a type utilized within the first wireless communications network for achieving frame synchronization and scrambling code detection in connection with a cell search.

4. The method according to claim 3 wherein the establishing step is performed while the mobile communications device operates in a Frequency Division Duplex mode.

5. The method according to claim 3 wherein the establishing step is performed while the mobile communications device operates in a Time Division Duplex Mode.

6. The method according to claim 3 wherein the second network synchronization signal comprises a Primary-Channel Synchronization signal of a type utilized within the first wireless communications network for cell searching.

* * * * *